(12) United States Patent
Walker et al.

(10) Patent No.: US 10,515,419 B1
(45) Date of Patent: Dec. 24, 2019

(54) SYSTEMS AND METHODS FOR LEVERAGING REMOTELY CAPTURED IMAGES

(71) Applicant: United Services Automobile Association (USAA), San Antonio, TX (US)

(72) Inventors: Todd Patrick Walker, Helotes, TX (US); Christopher Maurice Norman, San Antonio, TX (US); Michael Kyne, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 200 days.

(21) Appl. No.: 15/434,308

(22) Filed: Feb. 16, 2017

Related U.S. Application Data

(60) Provisional application No. 62/296,295, filed on Feb. 17, 2016.

(51) Int. Cl.
*G06Q 40/08* (2012.01)
*G06K 9/00* (2006.01)
*G06T 7/00* (2017.01)

(52) U.S. Cl.
CPC ......... *G06Q 40/08* (2013.01); *G06K 9/00442* (2013.01); *G06T 7/0004* (2013.01); *G06T 2207/30176* (2013.01); *G06T 2207/30252* (2013.01)

(58) Field of Classification Search
CPC ...................................................... G06Q 40/08
USPC ......................................................... 705/4, 1.1
See application file for complete search history.

(56) References Cited

U.S. PATENT DOCUMENTS

| | | | |
|---|---|---|---|
| 8,239,924 B2* | 8/2012 | Ficko | G06F 21/34 726/5 |
| 9,721,147 B1* | 8/2017 | Kapczynski | G06Q 50/265 |
| 2006/0076397 A1* | 4/2006 | Langos | G06Q 10/087 235/375 |
| 2009/0216600 A1* | 8/2009 | Hill | G06Q 10/06 705/7.14 |
| 2011/0161118 A1* | 6/2011 | Borden | G06Q 40/08 705/4 |
| 2012/0130891 A1* | 5/2012 | Bogaard | G06Q 20/102 705/40 |
| 2012/0278155 A1* | 11/2012 | Faith | G06O 20/40145 705/14.26 |
| 2013/0345896 A1* | 12/2013 | Blumer | G06K 9/00624 701/1 |
| 2014/0344948 A1* | 11/2014 | Hayato | G06F 21/6218 726/26 |
| 2017/0171177 A1* | 6/2017 | Eramian | H04L 63/08 |
| 2019/0066224 A1* | 2/2019 | Strange | G06Q 40/08 |

* cited by examiner

*Primary Examiner* — William E Rankins
(74) *Attorney, Agent, or Firm* — Baker & Hostetler LLP

(57) ABSTRACT

Systems and methods can leverage images of remotely captured items to extract information, populate forms, authenticate users, and perform other actions.

19 Claims, 5 Drawing Sheets

SYSTEMS AND METHODS FOR LEVERAGING REMOTELY CAPTURED IMAGES

CROSS-REFERENCE TO RELATED APPLICATION

This application claims priority to and the benefit of U.S. Provisional Patent Application No. 62/296,295, filed Feb. 17, 2016, which is incorporated by reference herein in its entirety.

BACKGROUND OF THE INVENTION

Users today generate, provide, and receive tremendous amounts of data in their day to day lives. Much of this data is useful for various transactions and communications. Nonetheless, while this data can be digitized, users must still manually enter, speak, or otherwise provide a variety of information.

In one example, quoting insurance is time consuming for both the consumer and the insurance provider. The quoting process involves the insurance provider collecting a large amount of information directly from the consumer to generate an appropriate quote. The process requires that the insurance provider and the consumer engage in a lengthy dialog in which the insurance provider asks a large number of questions to insure that it has accurate and complete information. Unfortunately, many consumers lack the patience to deal with the process and drop from the sales cycle before the insurance purchase is complete. This process expends the insurance provider resources without converting to sales.

Other examples can relate to population of various forms or documents, authentication, and other actions.

SUMMARY

In an embodiment, a method can include receiving an image of a user item, recognizing the user item based on the image, extracting identity information about the user or the user item based on recognizing the user item and populating a form with extracted data based on the identity information.

In a further embodiment, a system can include non-transitory computer readable media and a processor. The non-transitory computer readable media stores instructions. When executed by the processor, the instructions can perform aspects comprising receiving an image of a user item, recognizing the user item based on the image, extracting identity information about the user or the user item based on recognizing the user item, and authenticating the user based on the identity information and recognizing the user item.

In another embodiment, a method can include receiving two or more images of two or more user items, recognizing the two or more user items based on the image, extracting identity information about the user and the two or more user items based on recognizing the user item, and batch populating at least one form with extracted data based on the identity information

BRIEF DESCRIPTION OF THE DRAWINGS

So that those having ordinary skill in the art, to which the present disclosure pertains, will more readily understand how to employ the novel system and methods of the present disclosure, certain illustrated embodiments thereof will be described in detail herein-below with reference to the drawings, wherein.

A component or a feature that is common to more than one drawing is indicated with the same reference number in each of the drawings.

DETAILED DESCRIPTION OF CERTAIN EMBODIMENTS

Figure 1:
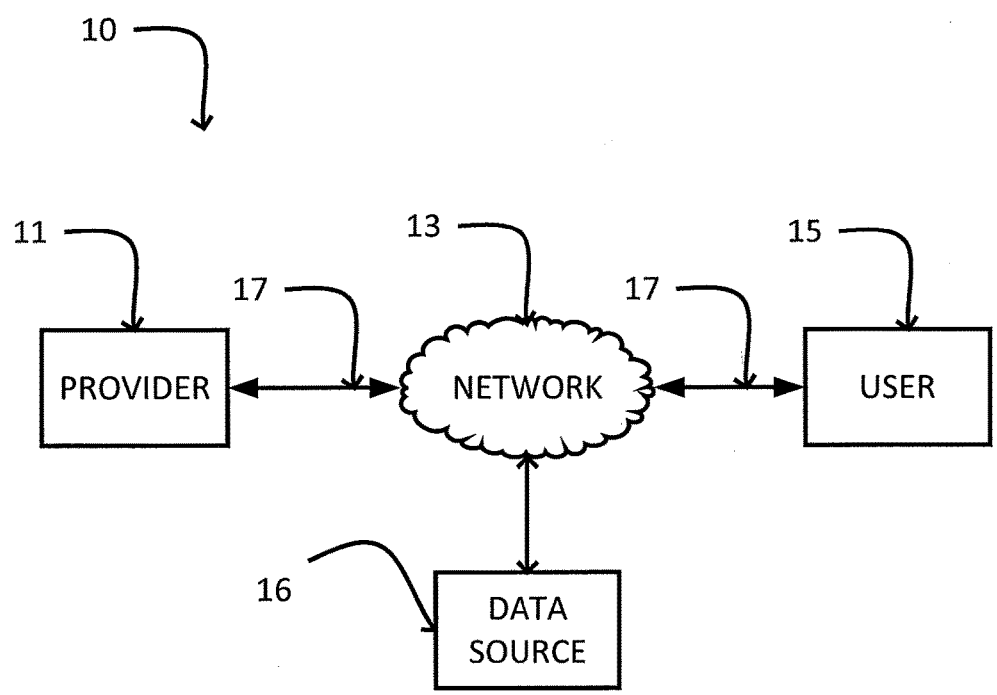
FIG. 1 is a block diagram of an example environment in which modules of a system of the present disclosure can be implemented.

The present disclosure is directed toward using remotely captured images of user items or other things in various contexts. It is to be appreciated the subject disclosure is described below more fully with reference to the accompanying drawings, in which illustrated embodiments of the present disclosure are shown. The present disclosure is not limited in any way to the illustrated embodiments as the illustrated embodiments described below are merely examples of the disclosure, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present disclosure. Furthermore, the terms and phrases used herein are not intended to be limiting but rather to provide an understandable description of the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, example methods and materials are now described.

It is noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof as known to those skilled in the art, and so forth.

It is to be appreciated that certain embodiments of this disclosure as discussed below are a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the disclosure based on the above-described embodiments. Accordingly, practicing this disclosure is not to be limited by what has been particularly shown and described, except as indicated by the appended claims. Further, although at least one series of steps are presented as an example method of practicing one or more embodiments described herein, it will be appreciated by those skilled in the art that the steps identified may be practiced in any order that is practicable, including without limitation the omission of one or more steps.

The communications described and referenced herein, including without limitation the accompanying figures and drawings, may utilize and/or traverse networks that may include a local area network (LAN), a wide area network (WAN), a personal area network (PAN), and/or combinations thereof. Such networking environments are commonplace in offices, enterprise-wide computer networks, intranets, and the Internet. For instance, when used in a LAN networking environment, one or more systems described herein are connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to one or more systems described herein, or portions thereof, may be stored in a remote memory storage device such as storage medium. Communication links 75 may comprise either wired or wireless links.

Particular terms are used herein for ease of explanation but are not to be interpreted in a limiting fashion. For example, the term "identity information" includes information exceeding the identity of a person or thing, and can relate to other records, account information, or details about the person or thing. In another example, a "user item" can include an item held, possessed, or owned by the user, but can additionally include anything accessible or proximate to the user of which the user can capture an image.

Referring to FIG. 1, an example insurance purchase system 10 is shown for illustrative purposes. In one example, the insurance purchase system 10 includes a provider 11, a network 13, a user 15, and at least one instance of a data source 16. The provider 11 in one example is an entity that wishes to sell insurance to the user 15. In one embodiment, the entity is an insurance company. In one embodiment, the entity may be an agent of an insurance company. In one embodiment, the entity may be a service provider of an insurance company. In one embodiment, the entity may be an employee of one of the preceding entities. In one embodiment, provider 11 may participate in system 10 utilizing one or more computing devices, such as the example device 320 shown in FIG. 2. In one embodiment, the insurance being provided is automobile insurance. This disclosure, however, is applicable to other forms of insurance. For instance, system 10 may be utilized in the provision of other types of insurance, such as health, homeowners, and/or life insurance.

Referring further to FIG. 1, network 13 may include a local area network (LAN), a wide area network (WAN), a personal area network (PAN), or combinations thereof. Such networking environments are commonplace in offices, enterprise-wide computer networks, intranets, and the Internet. For instance, when used in a LAN networking environment, provider 11 and user 15 are connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to system 10, or portions thereof, may be stored in a remote memory storage device such as storage medium. Computing devices may communicate over network 13 through one or more communications links formed between data interfaces. Communication links may comprise either wired or wireless links. It is to be appreciated that the illustrated network connections in the figures (e.g., FIG. 1 or FIG. 2) are examples and other ways of establishing a communications link between multiple devices may be used.

Referring further to FIG. 1, it should be noted that network 13 may be utilized to form one or more communication channels 17 between provider 11, user 15, and data source 16. A communication channel 17 may comprise a data communications channel, an audio communications channel, and/or video communications channel. Provider 11, user 15, and data source 16 may communicate through one or more communications channel 17. The provider 11, user 15, and data source 16 may switch freely between communications channels 17 in accordance with their preferences. The state of interaction between provider 11, user 15, and data source 16 may be stored in system 10 such that the provider 11, user 15, and data source 16 may pause an interaction and/or transaction and resume the interaction at a later time. The data related to such interaction may be stored as state data such that interaction may pick up from the place where it was suspended. Further, it is envisioned that provider 11, user 15, and data source 16 may begin an interaction utilizing a first communication channel 17, pause the interaction, and resume the interaction utilizing a second communication channel 17. The first communication channel 17 and the second communication channel 17 may be of different types.

Referring further to FIG. 1, user 15 in one example is an entity who wishes to inquire, price, and/or purchase insurance. In one embodiment, the entity may be an individual consumer. In one embodiment, the entity may be an organization, such as a business. In one embodiment, the entity may be an agent or service provider of the preceding entities. In one embodiment, user 13 may participate in system 10 utilizing one or more computing devices, such as the example device 320 shown in FIG. 2.

Referring further to FIG. 1, data source 16 in one example is an entity that has possession of data associated with user 15 and/or something that the user 15 wants to insure. For instance, if user 15 were interested in purchasing automobile insurance, data source 16 may be a source of data regarding user's 15 driving history and/or the history of user's 15 vehicle. In another embodiment, if user 15 wanted to purchase homeowners insurance, data source 16 may be a source of data regarding some aspect of user's 15 personal history and/or the history of the home that user 15 wanted to insure. In another embodiment, if user 15 wanted to purchase life insurance, data source 16 may be a source of data about user's 15 health history, working environment, living environment, and the like.

Referring further to FIG. 1, in one embodiment, data source 16 may be maintained by provider 11. In one embodiment, data source 16 may be maintained by a third party. In one embodiment, data source 16 may be maintained by user 15. In one embodiment, data source 16 may be maintained by a combination of provider 11, user 15, and/or one or more third parties. In one embodiment, data source 16 may reside on one or more computing devices, such as the device 320 shown in FIG. 2 or a component thereof.

Figure 2:
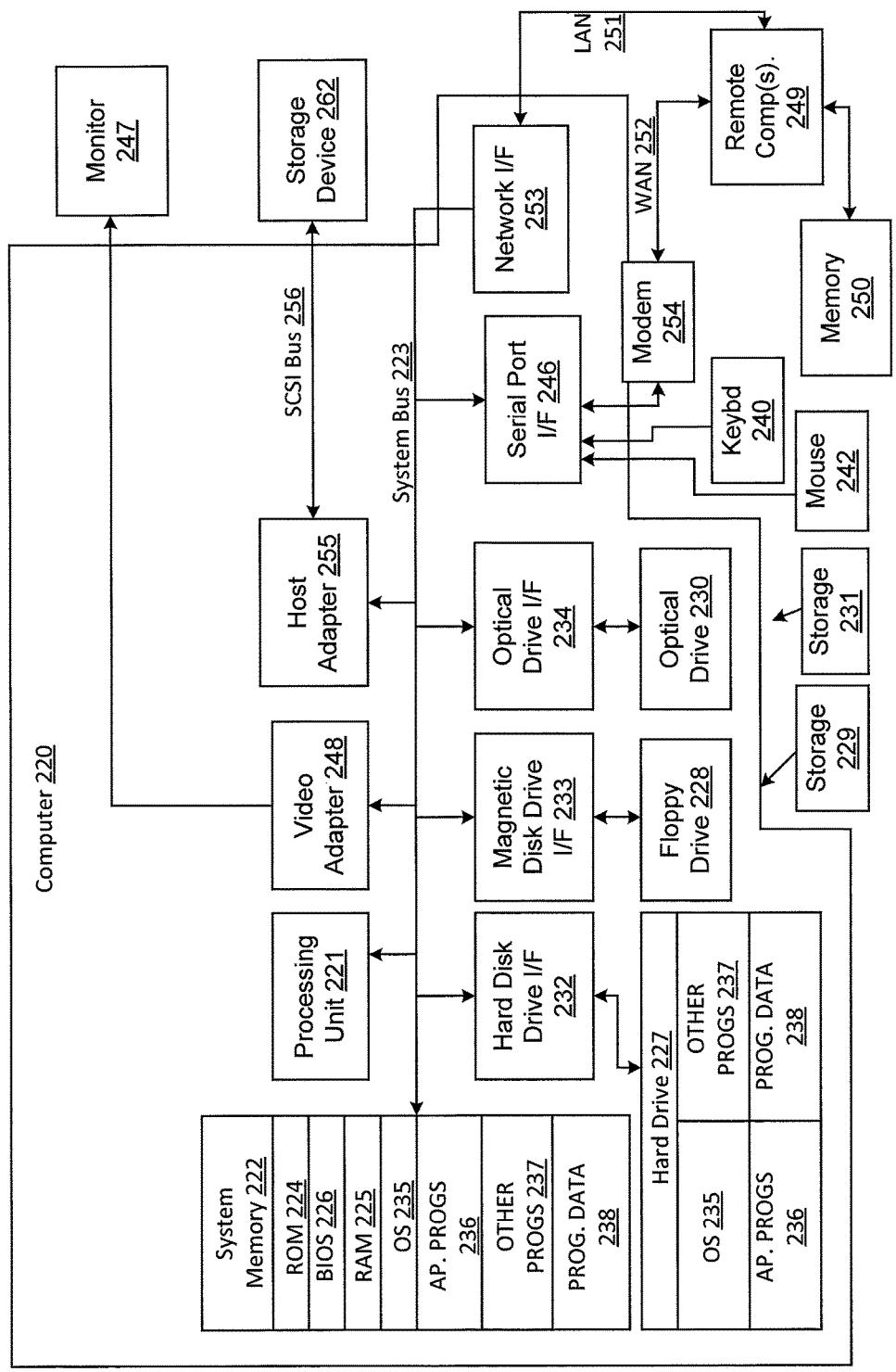
FIG. 2 depicts an embodiment of a computing device that may be utilized in conjunction with FIG. 1.

Referring to FIG. 2, a block diagram representing a general purpose computer system in which aspects of the methods and systems disclosed herein and/or portions thereof may be incorporated. As shown, the example general purpose computing system includes a computer 220 or the like, including a processing unit 221, a system memory 222, and a system bus 223 that couples various system components including the system memory to the processing unit 221. The system bus 223 may be any of several types of bus structures including a memory bus or memory controller, a peripheral bus, and a local bus using any of a variety of bus architectures. The system memory includes read-only memory (ROM) 224 and random access memory (RAM) 225. A basic input/output system 226 (BIOS), containing the basic routines that help to transfer information between elements within the computer 220, such as during start-up, is stored in ROM 224.

The computer 220 may further include a hard disk drive 227 for reading from and writing to a hard disk (not shown), a magnetic disk drive 228 for reading from or writing to a removable magnetic disk 229, and an optical disk drive 230 for reading from or writing to a removable optical disk 231 such as a CD-ROM or other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide non-volatile storage of computer readable instructions, data structures, program modules and other data for the computer 220. As described herein, a computer-readable medium is a tangible, physical, and concrete article of manufacture and thus not a signal per se.

Although the example environment described herein employs a hard disk, a removable magnetic disk 229, and a removable optical disk 231, it should be appreciated that other types of computer readable media which can store data that is accessible by a computer may also be used in the example operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on the hard disk, magnetic disk 529, optical disk 231, ROM 224 or RAM 225, including an operating system 235, one or more application programs 236, other program modules 237 and program data 238. A user may enter commands and information into the computer 220 through input devices such as a keyboard 240 and pointing device 242. Other input devices (not shown) may include a microphone, joystick, game pad, satellite disk, scanner, or the like. These and other input devices are often connected to the processing unit 221 through a serial port interface 246 that is coupled to the system bus, but may be connected by other interfaces, such as a parallel port, game port, or universal serial bus (USB). A monitor 247 or other type of display device is also connected to the system bus 223 via an interface, such as a video adapter 248. In addition to the monitor 247, a computer may include other peripheral output devices (not shown), such as speakers and printers. The example system of FIG. 2 also includes a host adapter 255, a Small Computer System Interface (SCSI) bus 256, and an external storage device 262 connected to the SCSI bus 256.

The computer 220 may operate in a networked environment using logical connections to one or more remote computers, such as a remote computer 249. The remote computer 249 may be a personal computer, a server, a router, a network PC, a peer device or other common network node, and may include many or all of the elements described above relative to the computer 220, although only a memory storage device 250 has been illustrated in FIG. 2. The logical connections depicted in FIG. 2 include a local area network (LAN) 251 and a wide area network (WAN) 252. Such networking environments are commonplace in offices, enterprise-wide computer networks, intranets, and the Internet.

When used in a LAN networking environment, the computer 220 is connected to the LAN 951 through a network interface or adapter 253. When used in a WAN networking environment, the computer 220 may include a modem 254 or other means for establishing communications over the wide area network 252, such as the Internet. The modem 254, which may be internal or external, is connected to the system bus 223 via the serial port interface 246. In a networked environment, program modules depicted relative to the computer 220, or portions thereof, may be stored in the remote memory storage device. It will be appreciated that the network connections shown are examples and other means of establishing a communications link between the computers may be used.

Computer 220 may include a variety of computer readable storage media. Computer readable storage media can be any available media that can be accessed by computer 220 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 220. Combinations of any of the above should also be included within the scope of computer readable media that may be used to store source code for implementing the methods and systems described herein. Any combination of the features or elements disclosed herein may be used in one or more examples.

Figure 3:
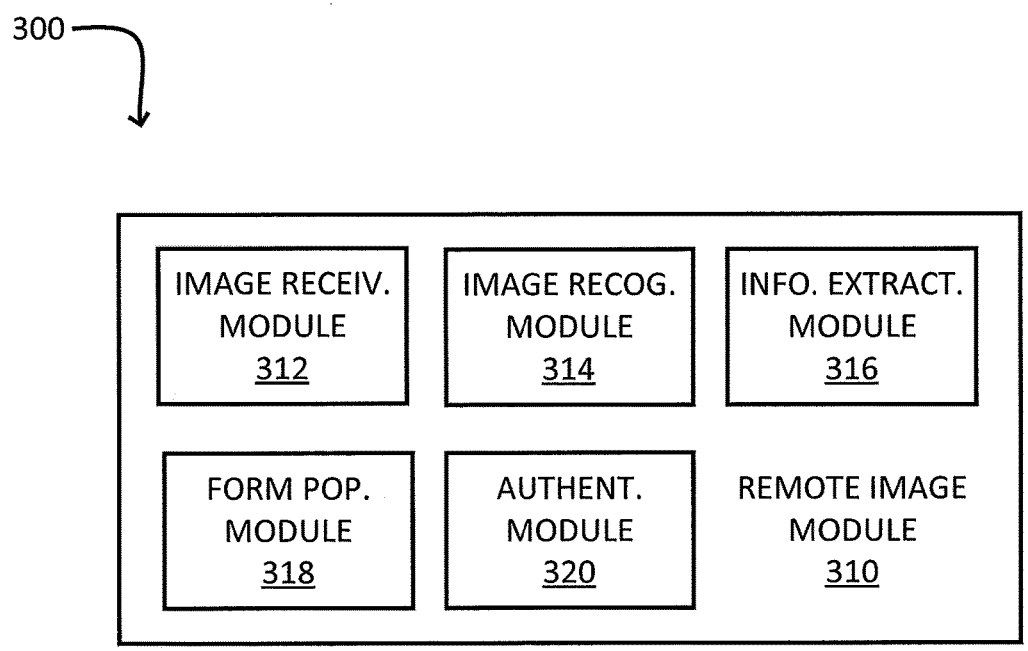
FIG. 3 illustrates a block diagram of an example system disclosed herein.

Turning to FIG. 3, an example system 300 is shown illustrating a block diagram of a remote image module 310 for implementing aspects of the disclosure herein. Remote image module 310 includes image receiving module 312, image recognition module 314, information extraction module 316, form population module 318, and authentication module 320. In relation to other aspects of the disclosure, remote image module 310 may be implemented on one of, or distributed across both of, provider 11 and data source 16. In alternative or complementary embodiments, at least a portion of remote image module may reside in or be accessible through network 13, or be partially or wholly resident on devices or services of user 15. While the aspects illustrated in, e.g., FIG. 3 can include the illustrated modules, subcomponents, et cetera, every embodiment need not include all elements illustrated, and other elements may be included without departing from the scope or spirit of the innovation. Further, while the particular arrangement is provided for ease of explanation and illustrative purposes, alternative embodiments providing different implementations are embraced within this disclosure. Further, the modules shown are not a comprehensive illustration of all possible modules, as others may be used alone or in conjunction with those shown to realize other aspects of the disclosure.

Image receiving module 312 can receive an image. The image can be of a user item or other aspects. The image can be pushed by the user in preparation for user action (e.g., planning to complete form or request document), or requested by remote image module 310 or related elements to provide or verify information (e.g., to qualify user, to authenticate user).

Image recognition module 314 recognizes at least a portion of the image. This can include various machine vision technologies for recognizing objects or characters thereon. In an embodiment, the machine vision can recognize a product, model, brand, et cetera. In embodiments, the machine vision can recognize a structure or place. In embodiments, the machine vision can employ optical character recognition (OCR) to recognize and read letters or numbers. Image recognition module 314 can combine various aspects, such as recognizing a house and numbered address thereon, a vehicle and license plate text thereon, et cetera.

Information extraction component 316 can extract information related to the user or item based on the image. In various embodiments, local, remote, public, and/or private databases can be searched based on aspects of the images recognized by image recognition module 314. Public databases can include, e.g., Internet searches, reverse image searches, public records from courts or government bureaus, and others. Private databases can include various organizational records, proprietary databases, personal data (e.g., of the user or a provider), and others. Information can be extracted from one or multiple databases. Information extraction component 316 can extract information based on the image itself, letters or numbers recognized in the image, or various combinations thereof.

Form population module 318 populates a form or document with the extracted information. This can include, e.g., filling in an application, request, et cetera, which can be web- or website-based, a fillable standalone file (e.g., Portable Document File), an image, a word processing document, a spreadsheet document, or others. The form or document can be populated with information from a database, including information about the user or a related entity (e.g., business, coworker, family), information about the user item common to all similar user items (e.g., parts for a particular model, manufacturer's suggested pricing, location), and/or information about the specific user item extracted from the image (e.g., customizations, damage, sale or owner history). The form can further be saved, transmitted, or otherwise provided to a user, provider, or other entity when at least one field is populated based on the extracted information.

Authentication module 320 is provided in particular embodiments where authentication is provided using remote image module 310. Authentication module can be used in embodiments alternative to, e.g., embodiments employing form population module 318, or can be provided complementarily with or without additional modules. Authentication module 320 can authenticate a user based on an image received by image receiving module 312. In an embodiment, user authentication can include providing an image of an item. In embodiments, the user can identify a secure item to use as a security item. In embodiments, remote image module 310 can support certain items for identification. Such certain items may or may not be individually secure, and can include items not readily accessible to entities seeking to fraudulently authenticate, such as, e.g., an identification or membership card, a credit or debit card, another device, a vehicle or vehicle keys, et cetera.

In embodiments, authentication module 320 can include, alone or in combination with the functionality of other modules, aspects to improve the security of image-based authentication. In an embodiment, authentication item(s) may not be static, but may rotate through a variety of items. For example, a car key, a license plate, a vehicle identification number (VIN) plate or sticker, a vehicle display showing vehicle-specific information, and other user-specific aspects could be vehicle-related authentication items for imaging. Authentication items can be dynamic in nature where alternative sources of data are available. For example, in an Internet of Things enabled vehicle, information such as mileage, radio presets, diagnostic screens, et cetera, can be accessed remotely, and captured images of such can be used for authentication. In embodiments, the time to capture or provide images of an item for authentication can be monitored and constrained. For example, on an authentication request, it may be required that a newly-captured image of an item to use with authentication be generated (e.g., cannot reuse a picture previously taken). Further, it may be required that the picture be taken within a time frame after the authentication request (e.g., one minute, ten minutes, thirty minutes) to limit the possibility of an improper authentication based on a malicious party's lack of immediate access to user items. To ensure such constraints are met, authentication module 320 or other modules (e.g., image receiving module 312) can interact with user devices to require that images be captured with a secure application, or receive further information from the device with the image to ensure process integrity. Further, authentication module 318 or related modules can provide details for how the picture is to be taken (e.g., particular angle, combining multiple items) to further reduce the possibility of tampering.

Aspects hereon can be described as methodologies, but can be implemented as systems. For example, a method hereon can be implemented as a system employing non-transitory computer readable media, and in some embodiments systems herein may be implemented as methodologies separate from the systems described.

Figure 4:
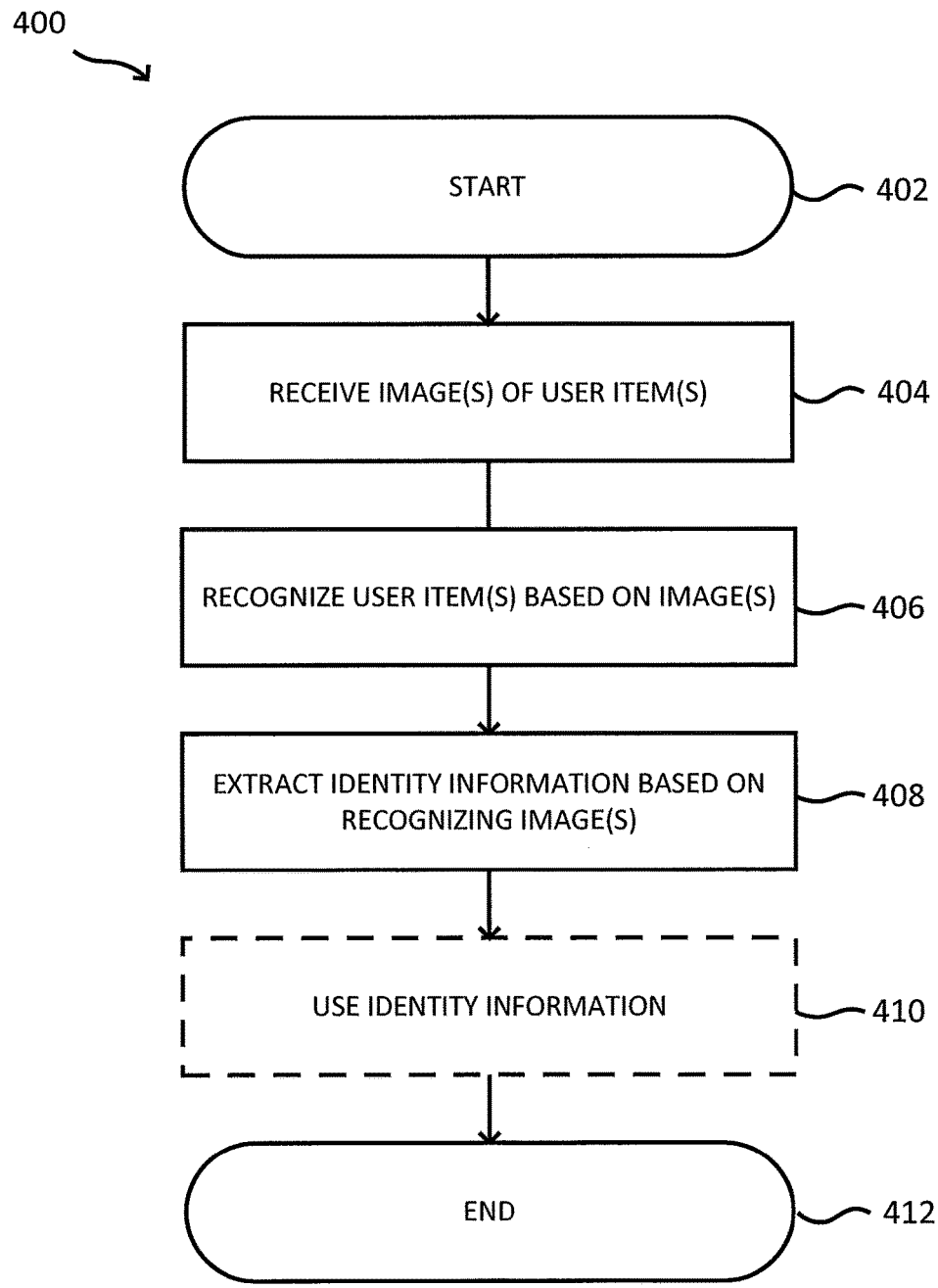
FIG. 4 illustrates a flowchart of an example methodology disclosed herein.

Turning to example methodologies, FIG. 4 illustrates a flowchart of an example methodology 400 for leveraging remotely captured images. Methodology 400 begins at 402 and proceeds to 404 where images of user items are received. The images can be received based on push or pull systems, where a user sends an image of a user item; or where a provider requests the image, to extract information or otherwise utilize imagery. In embodiments, multiple images can be received to allow for multiple concurrent actions, batch processing, enhanced security, or other aspects. The user item can be any number of things in the possession or control of the user. In embodiments, user items may include items known to be proximate to the user (e.g., office, landmark) such that they can serve to verify particular information. The user item can be, e.g., an identification card, at least a portion of a vehicle (e.g., interior or exterior view, picture of engine, picture of damaged part), a Vehicle Identification Number (VIN), a license plate, a structure or building, a portion of real estate or real property, a paper or digital document (e.g., contract, bill of sale, stock certificate, financial instrument, certification, inspection or maintenance record, et cetera), and others. In embodiments the user item can be a third party document, such as a contract (e.g., insurance quote or declaration page, contract for sale of services or goods) from which at least some information can be sourced without reference to a database.

Thereafter, at 406, the user item can be recognized based on the user image. Various image analysis, machine vision, and other techniques can be employed in recognizing the item as either or both of a type of item (e.g., product, model, brand) and/or an individual item (e.g., the user's particular item). One or more items can be recognized and analyzed in this fashion.

At 408, identity info nation is extracted based on recognizing the image or images. The identity information can be based on the image itself (e.g., specific customizations, damage, or one-of-a-kind item or property) and/or information extracted from databases. In an example, a driver's license or other identification card contains substantial information beyond references which can be used in databases. In another example, where the user item is a declaration page of an insurance policy, substantial information can be gleaned without consulting a database due to the details extractable using optical character recognition (OCR). In another example, the user item can be a portion of a vehicle including VIN plate or sticker, such that OCR is required to recognize the characters but databases (e.g., manufacturer, dealer, state motor vehicle department, and others) may be consulted using the characters to determine additional information.

With this identity information, at 410, additional aspects can be performed utilizing the identity information. For example, use at 410 can include populating a form with extracted data based on the identity information. The form can be any number of signup forms, application forms, contracts, requests, et cetera.

In an embodiment the form can relate to insuring a vehicle. In such embodiments, an additional aspect can include identifying a vehicle model identified by the VIN. Particular aspects can relate to driverless vehicles, where further aspects can include determining the vehicle model is a driverless vehicle and generating an insurance quote for the driverless vehicle based on the vehicle model. Focusing insurance quoting or enrollment based on a driverless vehicle model is possible because actuarial issues may be more driven by the model than a user or passenger due to the vehicle model being autonomous.

In alternative or complementary embodiments, an entry can be created in a vehicle database (e.g., based on the VIN or other vehicle information). This allows consistent tracking of vehicles in terms of owners or records, and in the event of connected, smart, or Internet of Things vehicles, permits pairing with vehicle-based diagnostics, authentication, or other data.

In alternative or complementary embodiments, vehicle identification can be used with insurance claims or repairs. In embodiments, further aspects can include determining a damaged part of the vehicle (e.g., based on the picture, based on other user inputs, based on database records). Further aspects can also include locating at least one replacement for the damaged part of the vehicle based on the image, locating a service provider to perform repairs, requesting additional services such as transportation or rentals, searching for replacement vehicles, cross-referencing other records or providing records to another entity related to a particular event (e.g., medical claim or records related to auto claim or records), et cetera.

In alternative or complementary embodiments not requiring vehicles, use at 410 can include authenticating the user based on the identity information and recognizing the user item. In such embodiments, an earlier aspect may include requesting the image of the user item in response to a request to authenticate the user. In particular embodiments, to enhance security, the image of the user item must be captured after the request to authenticate the user and/or the image is captured with a proprietary application on a user device.

In embodiments, the user item or image can be associated with an electronic signature to a document, and fields of the document can be populated based on the identity information. In addition to populating fill-in-the-blank forms, more detailed documents may be drafted based on extracted information.

In still further alternative or complementary embodiments, the identity information can be used in conjunction with purchases, financing, or other transactions. These can include leveraging identity information to apply for or complete a loan (e.g., home, vehicle, student, personal), execute a purchase (e.g., major purchase), contract for services, et cetera.

In still further alternative or complementary embodiments, the identity information may be used in an ongoing process which is not completed in a single communication or session. For example, complex applications requiring analysis and assessment by provider personnel before advancing may be leveraged. In such situations, further aspects can include saving the extracted data as state data, wherein the form is part of ongoing communications. In this fashion, data can be collected efficiently and persist through the end of a process to avoid requiring re-entry.

In still further alternative or complementary embodiments, the further actions can be populating or completing a similar form or process to one reflected in or by the user item. This can be done one or multiple times. For example, by providing an insurance declaration page or specific pages from a home loan contract from a third party, one or more additional applications or contractual forms can be filled out identically or similarly to allow for rapid switching of providers or easy comparison of similar offers from multiple parties using the parties' own systems.

As alluded, multiple images of multiple user items may be provided or requested. In this regard, further aspects can include batch populating two or more forms with extracted data based on the identity information. In this fashion, batch processing can be completed to complete multiple forms related to a variety of items at once. Instances for using such embodiments can include, e.g., fleet purchases or contracts, organizational or family submissions, group recordkeeping, et cetera.

Figure 5:
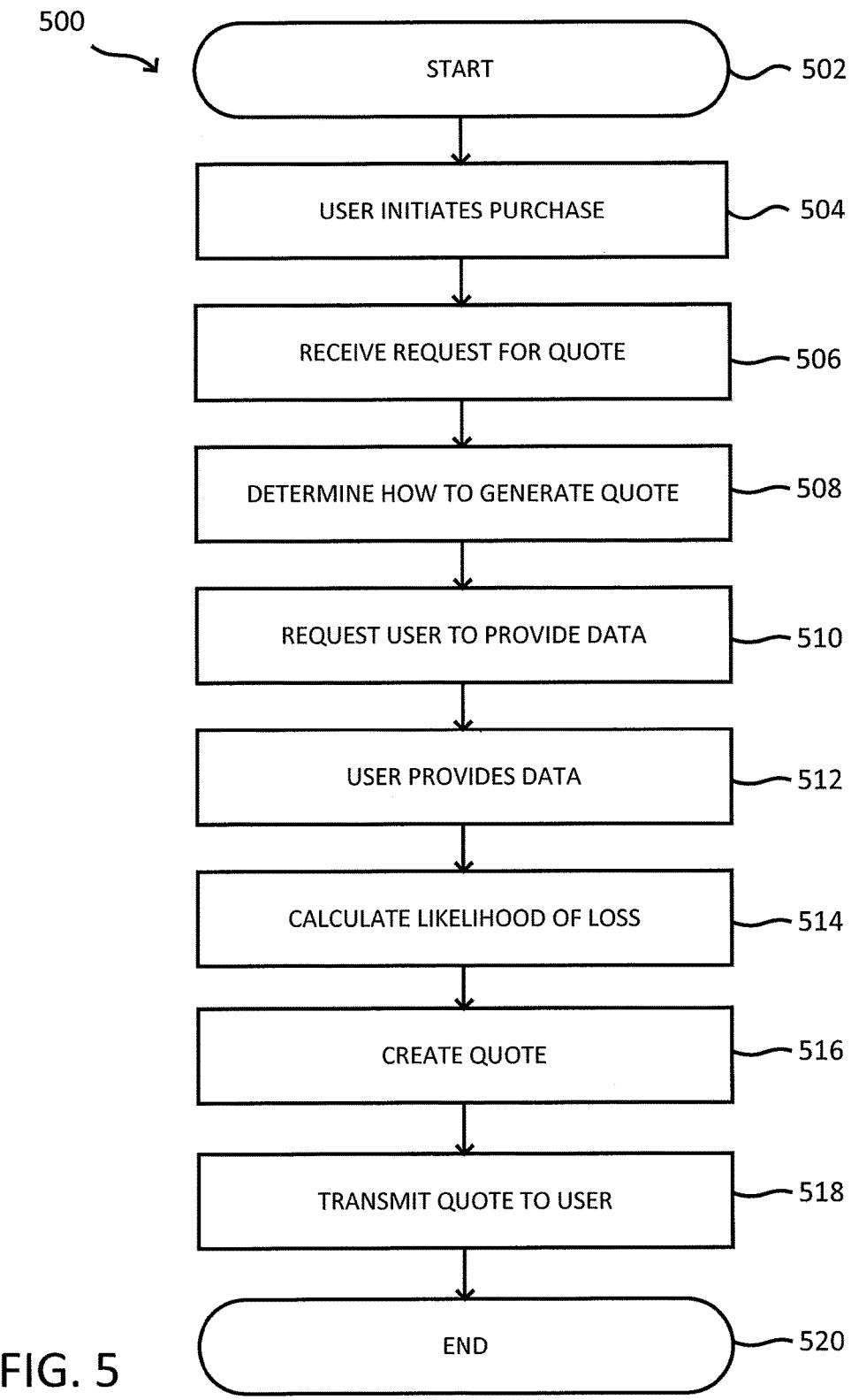
FIG. 5 illustrates a flowchart of another example methodology disclosed herein.

Referring to FIG. 5, a more specific example methodology 500 (e.g., operating on system 10) is described. Methodology 500 is provided for illustrative purposes, and not intended to limit the scope or spirit of the disclosure as to alternative embodiments described herein. In one embodiment, process begins with step 508. In step 508, user 15 initiates a purchase. Such an initiation may involve provider 11 providing information about various insurance policies and offering the user 15 an opportunity to select a policy and request a quote.

In step 506, provider 11 receives a request for a quote from user 15. In step 508, provider 11 makes a determination as to how to generate a quote for an insurance policy while requesting minimal information from user 15. In one embodiment, provider 11 may determine that to provide the quote, provider would like access to data associated with user 15 or something user 15 wants to insure. In one embodiment, such data may comprise one or more pieces of information about user 15 or something that user wants to insure. In another example, such data may comprise one or more identifiers for user 15 and/or the thing that user 15 wants to insure. For instance, an identifier may be a pointer that directs provider 11 to another location, such as data source 16, which may have the data that provider 11 would like to access. For example, an identifier may be an identification device, such as a driver license, a passport, an identification card, a vehicle identification number (VIN), or an address. In another example, an identifier may be an encoded representation of identification, such as a digitally encoded data. Examples include, but are not limited to, digital ID cards, digital tokens, digital identification codes, biometric data, behavioral pattern data, etc.

In step 510, provider 11 requests that user 15 provide the data to provider 11. For instance, in the example of automobile insurance, provider 11 may request that the user 15 provide a VIN and a driver license to provider 11. In the example of a self-driving vehicle, provider 11 may only request a VIN. In the case of homeowners insurance, provider 11 may request an address.

In step 512, user 15 provides the data to provider 11. In one example, user 15 may provide a VIN to provider by taking a picture of a vehicle and sending it to provider 11. Such a picture may include a digital representation of VIN. Provider 11 may perform character recognition on the digital representation to extract the VIN. In one example, such a picture may include enough information about the vehicle that provider 11 may obtain additional information about the vehicle. For example, the picture may allow provider 11 to identify the make, model, and license plate no. of the vehicle. Provider 11 may then use this information to obtain additional data from a data source 16, such as a vehicle history. In the case of homeowners insurance, user 15 may provide a picture of a home to provider 11. Provider 11 may use the picture to perform an image search to identify the property. Provider 11 may use the identity of the property to obtain additional information about the property from a data source 16.

In another example, user 15 may provide a driver license to provider by taking a picture of user's 15 driver license and sending it to provider 11. In another example, user 15 may send a picture of user 15 to provider 11. Provider 11 may use the picture to identify additional information about user 15. For example, the picture may allow provider to contact a data source 16 and obtain information about user 15 from the data source 16. For example, provider 11 may perform an image search and obtain user's identify from a data source, such as a social media website, an online directory, or an online records database.

Referring further to FIG. 5, in step 514, provider 11 utilizes data received in step 512 to calculate a likelihood of a claim or associated with providing user 15 with the desired insurance product. For example, provider 11 may determine that a vehicle with a history indicating that it has been well maintained reduces the likelihood of a loss whereas a vehicle that has not been well maintained increases the likelihood of a loss. In another example, a vehicle with a history of prior damage may increase the likelihood of a loss. In another example, a vehicle that is used for ridesharing services may have a higher likelihood of a loss than one that has not been used for a ride sharing service. In another example, a vehicle with tires that are regularly changed or rotated may have a lower likelihood of a loss. In another example, a user's driving history or personal characteristic may increase the likelihood of a loss. In the example of homeowners insurance, a property in a certain geographical area may have a higher likelihood of loss.

Referring further to FIG. 5, provider 11 may calculate the likelihood of a claim or loss by utilizing a scoring algorithm. For instance, provider 11 may calculate a score based on the user 15 data and a score based on vehicle data. Provider 11 may weight or correlate the user score and the vehicle score, in accordance with a weighting algorithm, to create a total risk score.

Referring further to FIG. 5, in step 516, provider 11 may convert the likelihood calculated in step 514 to a quote for insurance. For example, a vehicle score, user score, and/or total risk score may correlate to a particular premium or range of premiums for an insurance product. In step 518, the quote is transmitted to user 15 who can then make a decision as to whether or not to purchase the insurance.

It should be noted that the present disclosure includes using the methodology 500 as a purchase tool. For instance, user 15 could provide information, simultaneously or sequentially, regarding a plurality of vehicles or properties and receive a plurality of quotes corresponding to each vehicle or property. The quotes may be appended to a total cost of ownership calculation and displayed for the user 15 such that the user 15 could compare the cost of owning the vehicles or properties.

In describing examples of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system, comprising:
   non-transitory computer readable media and a processor, the non-transitory computer readable media storing instructions that when executed by the processor perform aspects comprising:
   receiving an image and identity information from a user device, wherein the image includes a user item;
   comparing the image to least one previously received image of the user item;
   determining that the image is a new image of the user item based on comparison to the previously received image of the user item;
   comparing the new image to at least a current secure item record among two or more secure item records, wherein the current secure item record is determined based on a rotation of secure items;

recognizing the user item as a current secure item among two or more secure items based on the comparison
determining that the new image corresponds to at least the current secure item record;
and
authenticating the user based on the identity information and recognizing the current secure item.

2. The system of claim 1, the secure item is an identification card.

3. The system of claim 1, the secure item includes a vehicle, wherein a Vehicle Identification Number (VIN) is included in the image.

4. The system of claim 3, further comprising:
identifying a vehicle model identified by the VIN;
determining the vehicle model is a driverless vehicle; and
generating an insurance quote for the driverless vehicle based on the vehicle model, wherein generating the insurance quote does not require driver information due to the vehicle model being autonomous.

5. The system of claim 3, further comprising:
determining a damaged part of the vehicle based on the image; and
locating at least one replacement for the damaged part of the vehicle based on the image.

6. The system of claim 1, the user item is a structure.

7. The system of claim 1, the non-transitory computer readable media further including instructions that when executed by the processor perform aspects including:
populating a form with extracted data based on the identity information
wherein the form is to complete a purchase.

8. The system of claim 7, the non-transitory computer readable media further including instructions that when executed by the processor perform aspects including:
extracting information about the user or the user item based on recognizing the current secure item; and
saving the extracted information as state data, wherein the form is part of ongoing communications.

9. The system of claim 1, the identity information is extracted from a proprietary database and a public records database.

10. The system of claim 1, the user item is a third party document.

11. The system of claim 1, the non-transitory computer readable media further including instructions that when executed by the processor perform aspects including:
requesting the image in response to a request to authenticate the user.

12. The system of claim 11, the image of the user item is captured after the request to authenticate the user.

13. The system of claim 11, the image is captured with a proprietary application on a user device.

14. The system of claim 11, the image is associated with an electronic signature to a document.

15. The system of claim 14, fields of the document are populated based on the identity information.

16. The system of claim 1, wherein user item includes two or more aspects, and wherein recognizing the current secure item comprises recognizing the two or more aspects.

17. The system of claim 1, wherein authenticating the user is based on the new image being taken within a threshold period of time before receiving the image.

18. The system of claim 1, wherein authenticating the user is based on the image representing the secure item according to a specified angle.

19. The system of claim 1, wherein the image includes an additional secure item, and wherein authenticating the user is based on recognizing the additional secure item.

* * * * *